Dec. 10, 1946.    W. F. ALLER    2,412,380
GAUGING DEVICE
Filed May 22, 1944    3 Sheets-Sheet 1

INVENTOR.
BY  W. F. Aller
Edward J. Noe
ATTORNEY.

Dec. 10, 1946.  W. F. ALLER  2,412,380
GAUGING DEVICE
Filed May 22, 1944  3 Sheets-Sheet 2
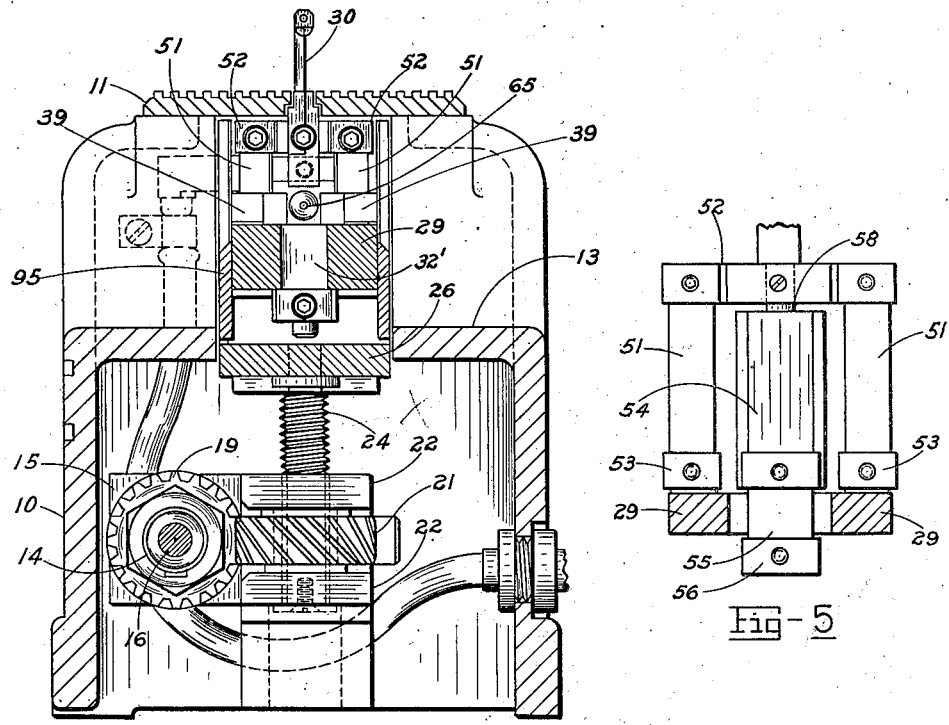
Fig-3
Fig-5
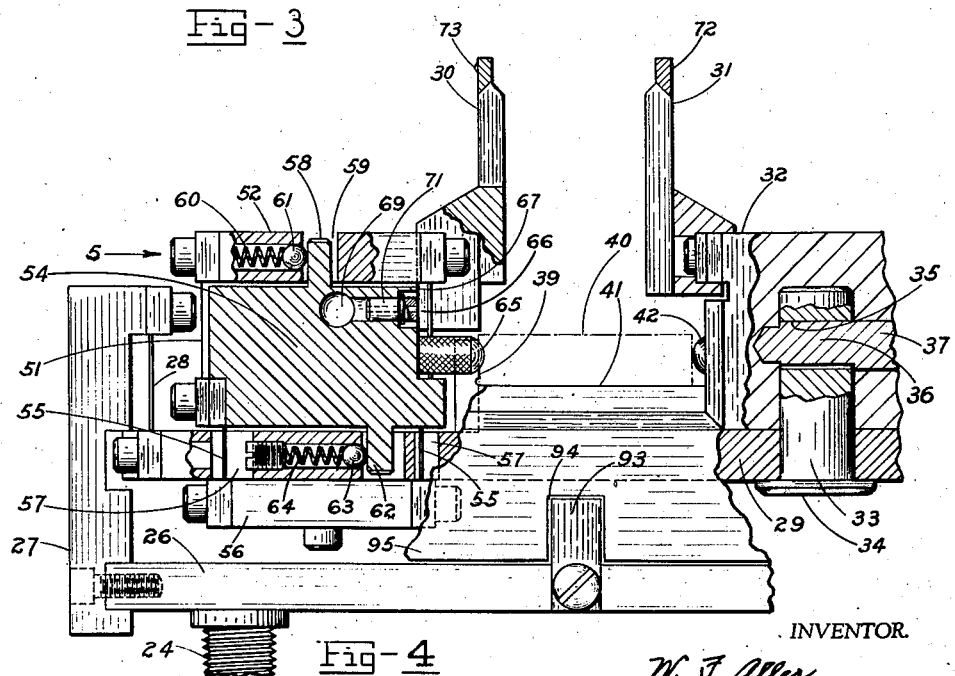
Fig-4
INVENTOR.
W. F. Aller
BY Edward T. Norig
ATTORNEY.

Dec. 10, 1946.  W. F. ALLER  2,412,380
GAUGING DEVICE
Filed May 22, 1944   3 Sheets-Sheet 3

INVENTOR.
W. F. Aller
BY Edward J. Noe Jr.
ATTORNEY.

Patented Dec. 10, 1946

2,412,380

UNITED STATES PATENT OFFICE 2,412,380

GAUGING DEVICE

Willis Fay Aller, Dayton, Ohio, assignor to The Sheffield Corporation, Dayton, Ohio, a corporation of Ohio Application May 22, 1944, Serial No. 536,717

12 Claims. (Cl. 33—147)

This invention relates to gauging devices, and more particularly to gauging devices having relatively movable work engaging members with means for accurately gauging the relative spacing of said members.

One object of the invention is the provision of a gauging device having a pair of relatively movable work engaging members, the gauging device incorporating means responsive to variations in the relative spacing of said members and provision for adjusting said members with extreme precision to readily adjust the device for the measurement of parts of different sizes.

Another object is the provision of a gauging device adapted to measure or compare a cylindrical surface or the like by a measurement of the relative positioning of work engaging fingers contacting therewith, the construction providing for extremely precise adjustment in the relative location of the fingers for different diametrical lengths, by the use of a single master surface and spacing blocks of predetermined length.

Another object is the provision of a gauging device having a pair of relatively movable work engaging members one of which is mounted for yielding movement and is located by means of a master part, while the second is adjustably fixed on a support for movement towards and from the first and providing for variation in its adjustment through distances of accurately determined length measured by means of spacer or Johansson blocks.

Another object is the provision of a gauging device of the character mentioned, and embodying a pair of relatively movable work engaging members one of which is relatively fixed on a support and the other of which is mounted for relative movement and cooperating with a located member that is accurately and exactly spaced from the relatively fixed gauging member by means of spacing or Johansson blocks.

Other objects and advantages of the invention will be apparent from the following description, the appended claims and the accompanying drawings, in which, Fig. 1 is a side elevation of a gauging device embodying the present invention, a portion of the standard or base being shown in vertical section;

Fig. 3 is a vertical section on the line 3—3 of Fig. 1;

Fig. 4 is a view on an enlarged scale showing the relative arrangement of the work engaging members and their supporting means;

Fig. 5 is a detail view showing the connection between the movable work engaging finger, the located block and the support on which these are arranged, looking in the direction of the arrow 5 in Fig. 4;

Figures 1, 2:
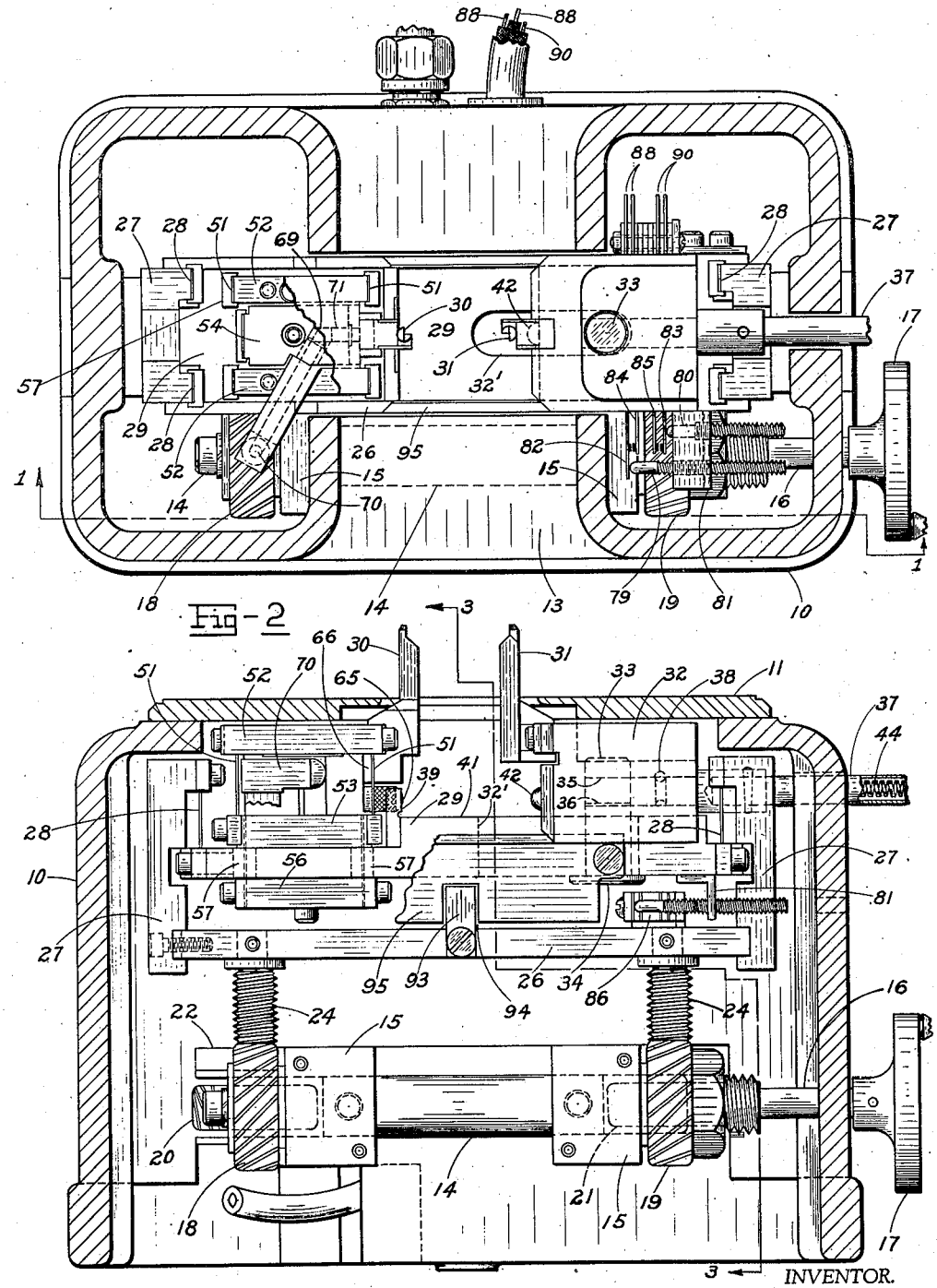
Fig. 2 is a top plan view of the gauging device with the upper portion of the standard shown in horizontal section.
Figure 6:
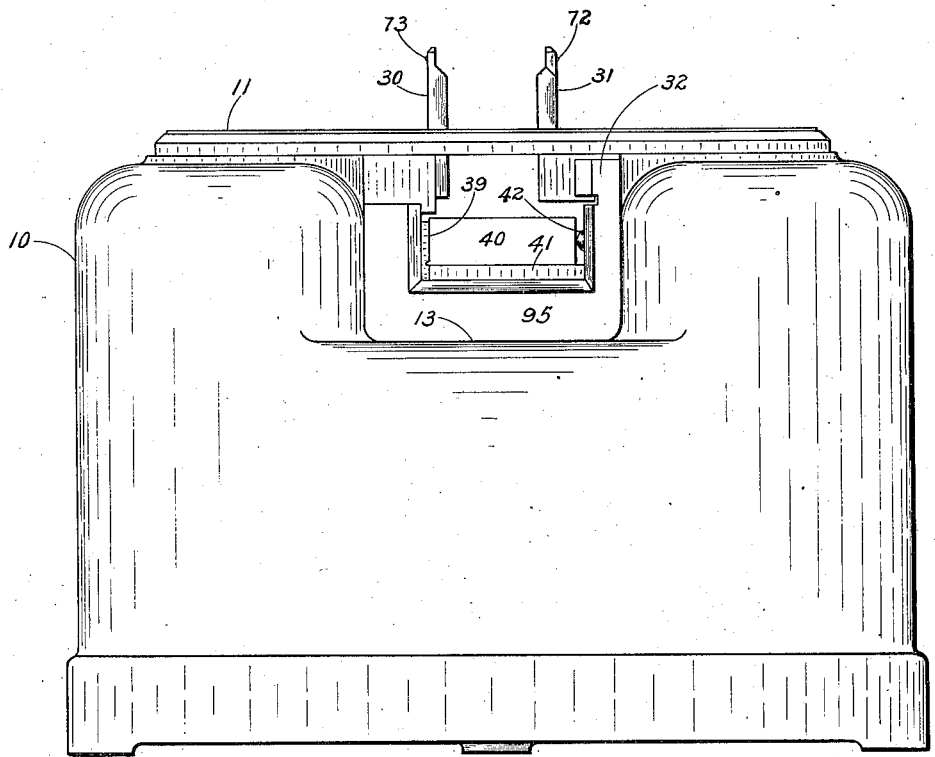
Fig. 6 is a front elevation of the gauging device.

Referring more particularly to the drawings in which like parts are designated by the same reference numerals in the several views, 10 generally designates a standard or base having suitable side walls which carry a work supporting plate 11 on which the workpiece to be gauged can be applied. As shown in Figs. 2 and 6, the opposite end portions of the base project upwardly to a point well above the level of a wall 13 provided between these end portions below the work carrying plate 11.

A shaft 14 extends horizontally along the lower portion of the base and is rotatably mounted in bearing blocks 15. End portion 16 of this shaft projects through an opening in the end wall of the base and is provided with an operating hand wheel 17. Fixed to the shaft 14 are two gears 18 and 19 meshing with gears 20 and 21 which are held against axial movement between bearing plates 22. These gears 20 and 21 are internally threaded and serve as nuts, operating on vertical threaded posts 24 so that as the shaft 14 is rotated by means of the hand wheel, the threaded posts 24 are simultaneously raised or lowered.

The upper ends of the threaded posts 24 are connected to a carrier 26 which has upstanding arms 27 the upper ends of which are secured to depending spring blades 28. The lower ends of these spring blades are fastened to a support 29 extending horizontally in the base 10 below the work holding plate 11. This support 29, on which the work engaging members are arranged and carried, is thus held for yielding horizontal movement below the work carrying plate, being movable in a direction parallel to the work supporting surface of this plate and in the direction in which the work engaging fingers themselves are relatively movable.

In the particular embodiment of the invention illustrated, the gauging device is adapted for measuring internal diameters or the like on a workpiece applied around the work engaging members and resting on the plate 11, the work engaging fingers 30 and 31 projecting through a slot in the plate 11 and being vertically adjustable by operating the wheel 17 so that gauging measurements may be taken at different points along the length of the hole being checked. One of these work engaging members, as indicated at 30, is held for yielding movement towards and from the second member 31, the two members 30 and 31 being formed as fingers which may be nested close to one another for gauging a hole of very small diameter, or which may be widely separated to any desired extent within the limits of the length of the base. The finger 31 is fixed on an adjustment block 32 which is slidably supported on the upper surface of the support 29 for movement towards and from the first finger 30. There is a slot 32' in the support 29, and a clamping stud 33 having a head 34 at its lower end longitudinally operable along this slot, with the head 34 projecting out beyond the slot and below the support. The stud 33 is guided for vertical movement in the block 32 and is provided with a cylindrical transverse passage 35 which receives an eccentric portion 36 on a locking stem 37 which is rotatably mounted in the block 32 and which is held against endwise movement in this block by means of a spring collar 38. This stem projects from the base 10 through a vertical slot in the base. By pushing the locking stem axially the block 32 may be moved towards the finger 30 and then by rotating the stem 37 on its own axis, the eccentric portion 36 exerts an upward pressure on the stud 33 and clamps the block in fixed position on the support 29.

The support 29 is provided with two laterally spaced abutments 39 for contacting one end of a spacing block such as a Johansson block 40 of predetermined length which rests on a flat block supporting surface 41 on the support 29. The other end of the spacing block 40 is engaged by an abutment 42 preferably arranged centrally of the block 32 and between the two spaced abutments 39. By applying spacing blocks of different known lengths, between the abutments 39 and 42, the extent to which the finger 31 may be adjusted along the support 29 can be accurately and exactly determined.

Figure 7:
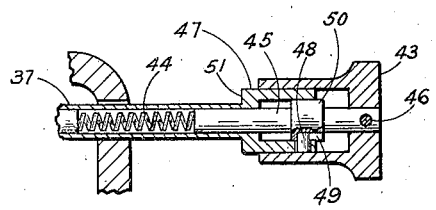
Fig. 7 is a vertical sectional view showing the means by which the adjustable gauging member is moved and held.
Figure 8:
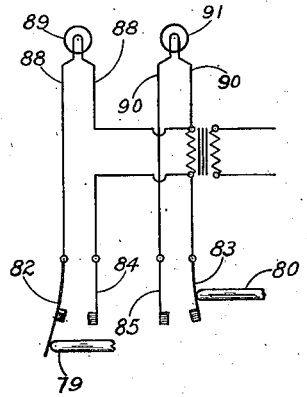
Fig. 8 is a diagrammatic showing of the electrical connections to the control lights.

In moving the block 32 against the spacing block 40, the adjusting and holding means for the block 32 is arranged so that a predetermined or constant pressure is exerted against the spacing block. Fig. 7 shows how the adjusting knob 43 is connected to the stem 37 to apply the same pressing force in an axial direction, and to rotate the stem in order to lock or clamp the block 32 in adjusted position. As shown, the stem 37 is hollow and contains a spring 44 applied between the stem and the positively controlled rod 45 which is fixed by means of a screw 46 to the knob 43. The knob 43 is telescopically slidable on the boss 47 at the end of stem 37 so that by pushing the knob 43 towards the left as viewed in Fig. 7, axial pressure is exerted on the stem 37 only through the spring 44. To turn the stem for locking purposes, there is a pin 48 on the boss 47 projecting into an axially extending slot 49 on a ring 50 which is fixed to the rod 45. When the pin is within the slot 49, rotational movements of the knob 43 will rotate the stem 37. However, this will not take place if too much pressure is exerted on the knob 43, and under those conditions the ring 50 will be pressed to the left far enough to bring the end of the slot beyond the center of the pin 48. When the knob 43 is pressed far enough to bring the end of the knob adjacent the shoulder 51 on stem 37, the proper pressure will be exerted through the spring 44, and the center of the pin 48 will still be within the slot 49 and locking operation can be effected.

The finger 30 is mounted for yielding movement towards and from the second finger by means of four vertically extending parallel flexible spring blades 51 which are fixed at their upper ends to a block 52 carrying finger 30, the lower ends of the spring blades being secured to spaced side pieces 53 on the support 29. In the space provided between the side pieces 53 and below the block 52 is a located member 54 the position of which is obtained from the spacing block 40. The member 54 is mounted for yielding movement on the support 29 by means of a pair of flexible straight spring blades 55 secured at their lower ends to a portion 56 of support 29 and extending upwardly through slots 57 in the support and being secured at their upper ends to the member 54 as shown in Figs. 2 and 4. As apparent in Fig. 4, the member 54 is provided with a stem 58 received in an opening 59 of larger diameter than the stem and provided in the block 52. In this block is a spring 60 operating against a pressure ball 61 which bears against the stem 58 and yieldingly holds the finger 30 towards the left as viewed in Fig. 4 with respect to the member 54. Another stem 62 on the member 54 extends downwardly and is engaged by a ball 63 pressed by spring 64 which is arranged in the support 29 so that the located member 54 is yieldingly urged to the right with respect to the support. Fixed on the located member is an abutment 65, which is long enough to extend out beyond the faces of the abutments 39 on the support when there is no spacing block 40 on the support. However, with a spacing block 40 in place and with the second finger 31 moved towards the left with a constant pressure sufficient to overcome the pressure of spring 64, the spacer block 40 is held against the abutments 39 and the abutment 65 is forced to the left to a normal operating position. With no workpiece applied to the gauging finger, the spring 60 holds the finger 30 in its left hand limiting position so that the downwardly extending projection 66 of the finger 30 contacts the adjacent surface 67 of the located member.

Figure 9:
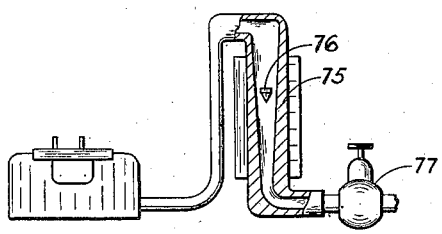
Fig. 9 is a diagrammatic view showing the rate of flow measuring device used in conjunction with the gauging device.

The adjacent portions of the located member and the projection 66 constitute gauging portions the relative spacing of which is measured by a suitable gauging device of any suitable character. As shown, this gauging device takes the form of a rate of flow indicator, measuring the rate of leakage of air supplied under pressure to a chamber 69 from a connection tube 70 which is connected to the gauging device illustrated generally in Fig. 9. Air supplied to the chamber 69 at a predetermined or constant pressure flows through a gauging orifice or nozzle 71 and passes out between the end of this nozzle and the projection surface 66 on the gauging finger, to a degree determined by the spacing between these parts. A slight clearance spacing of the order of a ten thousandth of an inch exists between these gauging surfaces when the gauging finger is held back in a limiting position as shown in Fig. 4.

When a master of known diameter is resting on the plate 11 the second gauging finger 31 is adjusted so that its gauging point 72 contacts with the work and so that the gauging point 73 on the first finger is held yieldingly against the work and is moved towards the finger 31 sufficiently far to bring the stem 58 out of contact with the side of the hole 59. With a spacing block 40 of the proper size between the abutments 39 on the support and the abutment 42 on the block that carries the finger 31, the abutment 65 is pushed back so as to lie flush with the abutments 39, thus moving the located member 54 to an exact position with respect to the support, precisely determined with respect to the second gauging finger by means of the block 40. Even though the block 40 may be slightly compressed where it is engaged by the abutments 39, the distance between the abutment 42 and the abutment 65 is precisely the same as the length of the block 40, and the pressure applied against the block 40 by the abutment 65 does not vary since this results entirely from spring 57. The block 40 thus holds the end of the gauging orifice in a definite position, slightly spaced from the cooperating gauging surface on the projection 66, permitting some leakage air to flow through this space, and corresponding to a normal indication on the gauging device.

Having set the parts to provide some normal indication on the gauging device with a master of exact and known diameter, the master may then be removed, and the parts to be checked can be applied successively. As a part is applied, it of course presses the first gauging finger 30 towards the right as viewed in Fig. 4 to an extent determined by the internal diameter of the part being gauged. If the inside diameter of the part is slightly undersize, the distance between the gauging nozzle on the located member and the gauging surface on the projection 66 will be slightly greater than what it was when the master was in place, and this will be apparent by a different reading obtained on the gauging device. If the part being checked is oversize, the distance between the gauging nozzle 71 and the cooperating gauging surface on the finger 30 will be reduced, thus decreasing the rate of flow, as evidenced by the different reading obtained on the gauging device.

Only one master of known size need be used, in accordance with the present invention, although the distance between the gauging fingers is adjustable to accommodate workpieces having holes of various diameters. If a master of one-half inch diameter is employed in conjunction with a spacing block 40 of exactly three-fourths inch diameter, for example, to give a normal reading on the rate of flow indicator, and it is desired to adjust the block 32 on support 29 to accommodate or gauge workpieces of five-eighths inch diameter, then a Johansson block of one-eighth inch thickness is used with the the spacer 40, and the hand knob 43 is operated to press these blocks between the abutments 42 and 39 with the exact pressure that was employed in the original set-up when only the block 40 was used. The knob 43 is then turned to clamp the block 32 in position on the support 29. The repositioning of the block 32 thus moves the located member to precisely the same position that it was originally, and the relationship between the normal position of the finger 30 and the located member 54 is precisely the same as it was before if the same normal reading is obtained on the instrument. Differences in reading from normal, when the part being checked is oversize or undersize, will indicate the same amount of oversize or undersize in the part as under the conditions of the original setup. Since Johansson blocks or their equivalent are readily available to the users of this type of apparatus, it will be understood that precise measurements or comparisons can be obtained without requiring the use of individual masters for each individual size to be gauged.

The gauging instrument itself, in the form illustrated, comprises a vertical transparent tube 75 the internal cross-sectional area of which increases gradually towards the upper end. Within this tube is a small light float or indicator 76 slightly smaller than the minimum inside diameter of the tube. The lower end of the tube is supplied with air under pressure from a suitable pressure regulator designated 77. The upper end of the tube is connected through flexible tubing to the tubular connection 70 which is fixed on the located member 54. The extent to which the float 76 rises in the tube 75 indicates the rate of flow taking place past the end of the gauging nozzle 71.

In gauging operations, the workpiece is held down on the plate 11 by the operator and in order to prevent errors due to pressure that he may apply towards one or the other of the gauging fingers, the entire support 29 and the parts carried thereby are yieldingly mounted for movement towards the right or left as viewed in Fig. 1. This mounting means comprises the suspension springs 28 previously mentioned. Thus the entire gauging assembly on the support 29 can float freely to a limited extent, without changing the relative spacing, in a gauging operation, between the end of the gauging nozzle 71 and the cooperating gauging face on the projection 66. To show any excessive movement and thus obviate errors that might be produced due to bending tendency in the fingers 30 and 31, means are provided to indicate when the support 29 is within a suitable range of movement and not at one or the other of its limiting positions. For this purpose, the support 29 is provided with a pair of contact fingers 79 and 80 adjustably threaded in an insulating bar 81 which is fixed on the support 29. The ends of these contact fingers engage flexible switch blades 82 and 83 respectively. Blade 82 cooperates with a rigid contact blade 84, these parts normally being held apart by the finger 79 when the support 29 is in its normal range of position. The blade 83 normally is spaced from a cooperating blade 85. Blades 82 to 85 inclusive are carried on an insulating block 86 mounted on the carriage 26. If there is undue movement of the support 29 towards the right as viewed in Figs. 1 and 2, the finger 79 will move towards the right far enough to permit the switch blades 82 and 84 to close, thus completing an electric circuit through connection wires 88 leading to a lamp 89 preferably arranged on the rate of flow indicator. If the support 29 is moved too far to the left, then the finger 80 will close the switch blade 83 against the blade 85 and complete a circuit through the wires 90 to a second lamp 91. When neither one of these lamps is illuminated, the operator will know that the circuit is arranged within the range in which accurate indications can be obtained.

In order to provide a positive stop against endwise movement of the support 29 to an excessive degree, the carriage 26 is provided with a fixed stop 93 projecting with suitable side clearance into a slot 94 and a face plate 95 fixed on the side of the carriage 26. This face plate 95 also serves to cover and conceal the side portions of the operating parts between the spaced upper walls of the base 10, leaving the sides of the opening below the plate 11 free to permit ready insertion or removal of the spacing blocks that are applied to the support 29.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauge comprising a pair of relatively movable work engaging members, a support, means for mounting one of said members for yielding movement towards and from the other member on said support, means for adjusting the second work engaging member with respect to the first member to any desired location of fixed positioning on said support, a work supporting structure, means yieldingly mounting said support on said structure for movement in the direction of relative movement of said work engaging members with respect to one another, said support having a receiving surface for carrying a spacing block of predetermined length, said support and the second work engaging member having abutment surfaces for engaging opposite ends of the spacing block, and means operable in response to changes in positioning of the first work engaging member with respect to said support.

2. A gauge comprising a pair of relatively movable work engaging members, a support, means for mounting one of said members for yielding movement on said support towards and from the other member from a normal position determined by a master, means for adjusting the second work engaging member with respect to the first member to any desired location of fixed positioning on said support, a work supporting structure, means yieldingly mounting said support on said structure for movement in the direction of relative movement of said work engaging members with respect to one another, a spacing block of predetermined length on said support, said support and the second work engaging member having abutment surfaces for engaging opposite ends of the spacing block to exactly locate said second member with respect to the normal position of the first member, and gauging means operable in response to changes in positioning of the first work engaging member from its normal position.

3. A gauge comprising a pair of relatively movable gauging members, a support, means for mounting one of said members for yielding movement towards and from the other member on said support, means for securing said second gauging member on said support in various positions of adjustment thereon, means for applying a predetermined moving pressure to the second gauging member to adjust its position on said support, said support and said second gauging member having abutment surfaces between which a spacing block of predetermined length is adapted to be received, and indicating means operable in response to changes in positioning of the first gauging member from a normal position under the control of a workpiece being gauged.

4. A gauging comprising a pair of relatively movable gauging members, a support, means for mounting one of said members for yielding movement on said support towards and from the other member from a normal position determined by a master, means for securing said second gauging member on said support in various positions of adjustment thereon, means for applying a predetermined moving pressure to the second gauging member to adjust its position on said support, said second gauging member having an abutment surface adapted for engagement with a spacing block of predetermined length arranged in a predetermined position on said support, and indicating means operable in response to changes in positioning of the first gauging member from its normal position.

5. A gauge comprising a pair of relatively movable work engaging members, means for mounting one of said members for yielding movement towards and from the other member, a support, means for adjusting the second work engaging member to any desired location of fixed positioning on said support, a located member, means for mounting said located member for yielding movement towards and from the second work engaging member, said located member having a block engaging abutment and said second work engaging member having a block engaging surface whereby a spacing block of predetermined size can be applied between said surface and said abutment to locate the located member with respect to said support in exact spaced relation from said second work engaging member, said located member and first work engaging member having cooperating portions movable with respect to one another, and means operable in response to variation in the relative positioning of said portions.

6. A gauge comprising a pair of relatively movable work engaging members, means for mounting one of said members for yielding movement towards and from the other member, a support, means for adjusting the second work engaging member to any desired location of fixed positioning on said support, a located member, means for mounting said located member for yielding movement towards and from the second work engaging member, said located member and said second work engaging member having block engaging abutments whereby a spacing block of predetermined size can be applied between said abutments to locate the located member in a gauging operation at an exact predetermined spacing from said second work engaging member, said located member and first work engaging member having cooperating portions movable with respect to one another, and gauging means operable in response to variation in the relative positioning of said portions.

7. A gauge comprising a pair of relatively movable gauging fingers, a support, means for mounting one of said fingers for yielding rectilinear movement on said support towards and from the second finger, means for adjustably fixing said second finger on said support to vary the spacing between said fingers, said support having a block receiving surface for carrying a spacing block of predetermined length, said support and said second finger having abutment surfaces for engaging opposite ends of the spacing block, a located member having a gauging portion cooperating with a gauging portion on said first finger, means for mounting said located member for yielding movement on said support towards and from said second finger, said located member having an abutment for contacting the spacing block on said support to definitely arrange the located member with an exact spacing from said second finger, and indicating means cooperating with the gauging portions on the located member and the first finger and responsive to variations in the relative positioning thereof.

8. A gauge comprising a pair of relatively movable gauging fingers, a support, means for mounting one of said fingers for yielding rectilinear movement on said support towards and from the second finger, means for adjustably fixing said second finger with respect to said support, said support adapted for carrying a spacing block of predetermined length and said support and said second finger having abutment surfaces for engaging opposite ends of the spacing block, means for urging the second finger with a constant pressure against the spacing block, a located member having a gauging portion cooperating with a gauging portion on said first finger, means for mounting said located member for yielding movement on said support towards and from said second finger, said located member having an abutment for contacting the spacing block to definitely arrange the located member with an exact spacing from said second finger, and means cooperating with the gauging portions on the located member and the first finger and responsive to variations in the relative positioning thereof.

9. A gauge comprising a pair of relatively movable gauging fingers, a support, means for mounting one of said fingers for yielding rectilinear movement on said support towards and from the second finger, means for adjustably fixing said second finger with respect to said support, said support adapted for carrying a spacing block of predetermined length and said support and said second finger having abutment surfaces for engaging opposite ends of the spacing block, means for urging the second finger with a constant pressure against the spacing block, a located member having a gauging portion cooperating with a gauging portion on said first finger, means for mounting said located member for yielding movement on said support towards and from said second finger, said located member having an abutment for contacting the spacing block to definitely arrange the located member with an exact spacing from said second finger, a work holder providing walls enclosing said support and a work holding plate through which said fingers project, and means on said work holder suspending said support for yielding movement parallel to the work holding plate.

10. A gauge comprising a pair of relatively movable gauging fingers, a support, means for mounting one of said fingers for yielding rectilinear movement on said support towards and from the second finger, means for adjustably fixing said second finger on said support to vary the spacing between said finger, said support having a block receiving surface for carrying a spacing block of predetermined length, said support and said second finger having abutment surfaces for engaging opposite ends of the spacing block, a located member having a gauging portion cooperating with a gauging portion on said first finger, means for mounting said located member for yielding movement on said support towards and from said second finger, said located member having an abutment for contacting the spacing block on said support to definitely arrange the located member with an exact spacing from said second finger, a work holder, and means for carrying said support for yielding movement on said work holder in a direction parallel to the work receiving portion of the work holder.

11. A gauge comprising a pair of relatively movable gauging fingers, a support, means for mounting one of said fingers for yielding rectilinear movement on said support towards and from the second finger, means for adjustably fixing said second finger on said support to vary the spacing between said finger, said support having a block receiving surface for carrying a spacing block of predetermined length, said support and said second finger having abutment surfaces for engaging opposite ends of the spacing block, a located member having a gauging portion cooperating with a gauging portion on said first finger, means for mounting said located member for yielding movement on said support towards and from said second finger, said located member having an abutment for contacting the spacing block on said support to definitely arrange the located member with an exact spacing from said second finger, a work holder having a flat work receiving surface the plane of which is interrupted by said gauging fingers, a carriage, means for adjusting said carriage in said work holder towards and from the work receiving surface thereof, and means for carrying said support on said carriage for yielding movement in a direction parallel to the direction of relative movement of said gauging fingers.

12. A gauge comprising a pair of relatively movable gauging fingers, a support, means for mounting one of said fingers for yielding rectilinear movement on said support towards and from the second finger, means for adjustably fixing said second finger with respect to said support, said support adapted for carrying a spacing block of predetermined length and said support and said second finger having abutment surfaces for engaging opposite ends of the spacing block, means for moving the second finger with a constant pressure applied to the spacing block, a located member having a gauging portion cooperating with a gauging portion on said first finger, means for mounting said located member for yielding movement on said support towards and from said second finger, said located member having an abutment for contacting the spacing block to definitely arrange the located member with an exact spacing from said second finger, a work holder having a flat work receiving surface through which said fingers extend, and means for adjusting said support in said work holder towards and from the work supporting surface.

WILLIS FAY ALLER.